(12) United States Patent
Dronzek

(10) Patent No.: US 6,461,708 B1
(45) Date of Patent: Oct. 8, 2002

(54) RESEALABLE CONTAINER AND CLOSURE SEAL

(75) Inventor: Peter J. Dronzek, Thornwood, NY (US)

(73) Assignee: Northstar Print Group, Watertown, WI (US)

( * ) Notice: Subject to any disclaimer, the term of this patent is extended or adjusted under 35 U.S.C. 154(b) by 0 days.

(21) Appl. No.: 09/372,736

(22) Filed: Aug. 11, 1999

(51) Int. Cl.[7] .................... B32B 15/08; B32B 27/08; B65D 43/02; B65D 51/22; B65D 77/20
(52) U.S. Cl. .................. 428/40.1; 428/41.8; 428/41.9; 428/42.1; 428/42.2; 428/43; 428/343; 383/78; 383/81
(58) Field of Search .................. 383/78, 81; 156/152; 428/40.1, 41.8, 41.9, 42.1, 42.2, 43, 343

(56) References Cited

U.S. PATENT DOCUMENTS

| | | | |
|---|---|---|---|
| 2,991,001 A | 7/1961 | Hughes | 229/62 |
| 3,154,239 A | 10/1964 | Madsen | 229/62 |
| 4,381,848 A * | 5/1983 | Kahn | 229/43 |
| 4,543,139 A * | 9/1985 | Freedman et al. | 156/152 |
| 4,722,166 A * | 2/1988 | Dieckow | 53/133 |
| 4,786,190 A | 11/1988 | Van Erden et al. | 383/61 |
| 4,840,270 A | 6/1989 | Caputo et al. | 206/205 |
| 4,902,142 A | 2/1990 | Lammert et al. | 383/78 |
| 5,389,415 A | 2/1995 | Kaufmann | 428/40 |
| 6,056,141 A * | 5/2000 | Navarini et al. | 220/269 |

FOREIGN PATENT DOCUMENTS

EP      661154 A1  *  5/1995

* cited by examiner

Primary Examiner—Shrive P. Beck
Assistant Examiner—Elena Tsoy
(74) Attorney, Agent, or Firm—Hedman & Costigan, P.C.

(57) ABSTRACT

A multilayer resealable container and closure seal for a container comprising a base layer and a face layer adhered together by an adhesive means, wherein said base layer of the seal is adherable to a container to be sealed by folding said closure seal over the opening of a container with greater adhesion of the base layer to the container to be sealed than adhesion of the face label to the base label so the face layer can be removed from the base layer with the base layer remaining adhered to the container and said closure is resealable by folding said face layer over said base layer.

17 Claims, 5 Drawing Sheets

RESEALABLE CONTAINER AND CLOSURE SEAL

The subject invention relates to resealable containers and resealable closure seals for containers or the like. The invention relates particularly to a multilayer seal for resealing a container such as a bag wherein at least a portion of said seal is permanently adherable to said bag.

BACKGROUND OF THE INVENTION

Resealable closures for containers are well known in the art. Typically such closures employ a perforated non-resealable closure and a pressure sensitive adhesive strip disposed near the opening of a container such as a bag wherein said non-resealable closure is manually opened and said pressure sensitive adhesive strip serves as the resealable closure. One such resealable closure is disclosed in U.S. Pat. No. 4,902,142, incorporated herein by reference, which discloses an adhesive tape for the reclosable closure of a tubular bag or the like comprising a base layer having two longitudinal adhesive regions separated by a nonadhesive region having a lateral tab for tearing in the longitudinal direction, wherein one of the adhesive regions is disposed over a perforation in the bag to be sealed. Another example of such a closure is disclosed in U.S. Pat. No. 4,786,190, incorporated herein by reference, which discloses a bag having a non-reclosable closure such as a peel seal or a tear line located inwardly of a reclosable closure formed of a pressure sensitive adhesive. U.S. Pat. No. 3,154,239 discloses a resealable bag comprising a saddle-type label having a portion thereof permanently adhered to one side of a non-reclosable bag and having a pressure sensitive adhesive disposed on another portion of said label for reclosably sealing the bag. U.S. Pat. No. 2,991,001 discloses a resealable bag having a tear strip covering an adhesive strip inside said bag for resealing said bag after the non-reclosable seal is opened.

However, the resealable closures of the prior art have several drawbacks. One of the chief shortcomings of the prior art is that the non-resealable closure is formed on the container or package itself, resulting in frequent instances of tearing of the container or package. For example, if the weakened or perforated area provided for the non-resealable closure is not weakened sufficiently, a tear may occur in the container or package itself rather than at the weakened area. It is not a solution to provide excessive weakening in a package such as a bag to avoid damage to the bag during opening, since excessive weakening of the bag results in a non-resealable closure insufficient to prevent premature opening. Nor is it a solution to provide a weak seal which can fracture and permit gas or moisture exchange because the seal no longer acts as a barrier.

In the present invention a foldable closure is provided which is adherable over a container opening wherein the closure comprises a face layer which may comprise polymer, paper, foil or a composite or laminate thereof, said face layer having a front side and a back side, a base layer which may comprise polymer, paper, foil or a composite or laminate thereof, said base layer having a front side and a back side, a releasable and resealable coating or coextruded layer disposed on at least a portion of said back side of said face layer and having an affinity for and adhered to said front side of said base layer, and an adherable coating or coextruded layer disposed on at least a portion of the back side of said base layer. The closure may include a perforation formed in the longitudinal direction to facilitate folding of the closure. The closure seal is folded longitudinally, such as along said perforation, over the opening of a container such that said adherable coating or coextruded layer is at least partially permanently adhered to said container to seal the container. The base layer may include a score cut which allows at least a portion of said base layer to be partially removed from said face layer. If the base layer is score cut the container will be unsealed as removal of the face layer reaches the base layer score cut. If the base layer is perforated, the container is opened by exerting manual pressure on said perforation. In either case, the closure is resealable by pressing said face layer onto said base layer, or alternatively, onto said container if the base layer is removed such as in the form of a coupon. The advantage of using a perforation is that the perforation may be employed to provide a tamper-evident seal. A combination perforation and score cut may be employed to perforate through both layers for ease of folding and score cutting through the base layer only for ease of opening.

The multi-layer construction of the present invention solves the problems associated with the prior art approach of forming a non-resealable closure from the container itself. The base layer of the closure adhered to the container may effectuate the original sealing of the container and the score cut or perforation disposed on the base layer of the closure seal facilitates opening of the container without risk of tearing the container itself. Moreover, the base layer permanently adhered to the container serves to reinforce the container in the area of the container opening. In the case where the base layer is only partially adhered to the container a portion of the base layer may be removed as a coupon and the face layer sealable directly to the container. Optionally, the use of a cling layer prevents adherence of foreign matter such as dust, dirt and food particles that could inhibit resealing. The closure seal of the present invention may be used to seal containers of various construction and composition, including but not limited to bags, packages, boxes and the like comprising coated paper, synthetic paper, plastic, foil, coated film or the like.

OBJECTS OF THE INVENTION

It is therefore an object of the present invention to provide a multilayer resealable closure seal comprising a base layer and a face layer, said face layer removably adhered to said base layer, wherein said base layer of the seal is preferably at least partially permanently adhered to the container to be sealed, by positioning said closure seal over the opening of a container, with greater adhesion of the base layer to the container to be sealed than adhesion of the face layer to the base layer so that the face layer can be removed from the base layer with the base layer remaining adhered to the container and said closure is resealable by reapplying said face layer over said base layer.

It is another object of the invention to provide a resealable container comprising the aforementioned resealable closure and the container to be sealed.

It is another object of the invention to provide a resealable closure for a container wherein the resealable closure provides reinforcement of the container to be sealed in the area of the container opening.

It is yet another object of the invention to provide a resealable closure for a container wherein said resealable closure comprises a perforated base layer providing a non-resealable closure and face layer providing a resealable closure.

It is still another object of the invention to provide a resealable closure for a container having a tamper-evident seal.

It is still another object of the invention to provide a resealable closure for a container wherein at least a portion of said base layer is removable in the form of a coupon or the like.

SUMMARY OF THE INVENTION

Accordingly, the present invention comprises a foldable multilayer resealable container closure comprising a base layer at least partially releasably adhered to a face layer, wherein said base layer is preferably at least partially permanently adherable to the container to be sealed, and wherein said base layer further comprises a longitudinal perforation for folding the closure over a container opening, and wherein said base layer may further comprise a score cut to facilitate removal of said base layer from said face layer, and wherein said face layer is foldable over said base layer after initial partial removal to reseal said bag. In another embodiment said perforation forms a non-resealable closure which is openable by exerting manual stress on said perforation. In still another embodiment a portion of said base layer is removable such as in the form of a coupon, and the face layer is resealable to the container to be sealed.

BRIEF DESCRIPTION OF THE DRAWINGS

Other objects and advantages of this invention may be seen from the following description when viewed in conjunction with the accompanying drawings wherein.

DESCRIPTION OF THE PREFERRED EMBODIMENT

Figure 1:
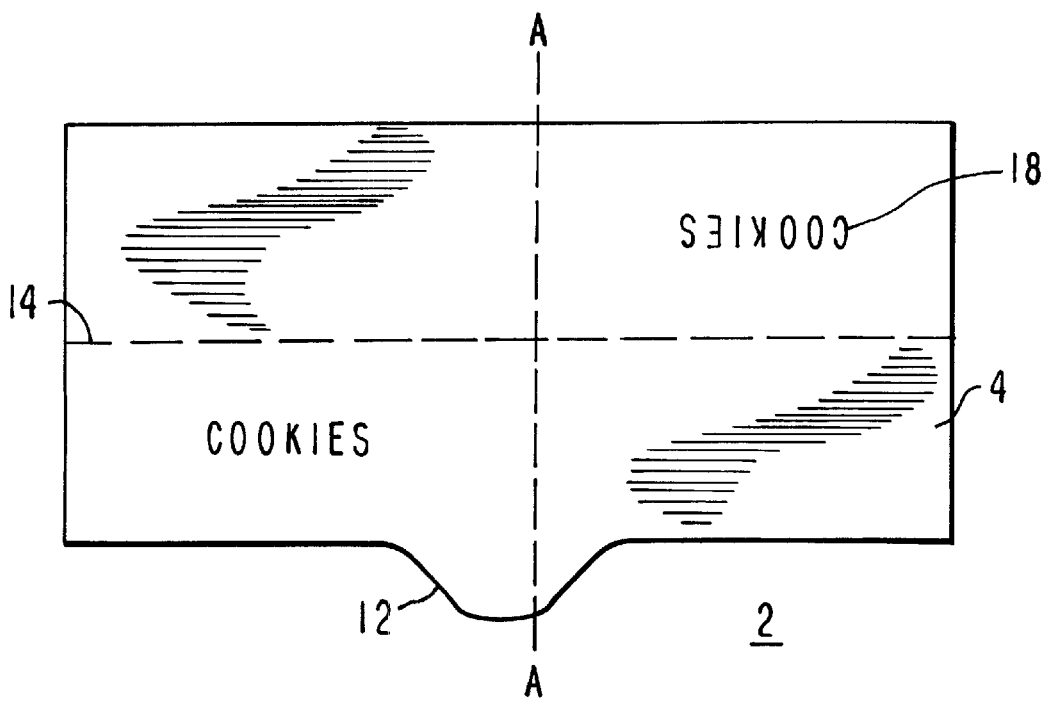
FIG. 1 is a top plan view of one embodiment of the closure seal of the present invention.

Referring now to FIGS. 1, 2, 3 and 4 the multi-layer closure seal 2 is shown comprising a first or face layer 4, a releasable coating or coextruded layer 6 disposed on at least a portion of the bottom side of said face layer 4, a second or base layer 8 having a top side adhered to said releasable coating or coextruded layer 6, and an adhesive coating or coextruded layer 10 disposed on the bottom side of said base layer 8. The closure seal 2 may further comprise a tab 12 formed on one or both of base layer 8 and face layer 4 for facilitating the lifting of said closure seal 2. The closure seal 2 preferably further comprises a fold line 14 formed in the longitudinal direction of said face layer 4 to facilitate folding of the closure. The fold line 14 may be in the form of a perforation, a region of thinned or weakened material, a score line or the like. Base layer 8 may further comprise at least one longitudinal perforation or cut 16.

Face layer 4 may comprise a polymer, paper or foil or a composite or laminate thereof. Examples of suitable polymers are coated or uncoated polymers such as but not limited to polypropylene, polyethylene and polyester and the like. A specific example of a suitable material for the face layer 4 is Mylar, a polyester available from DuPont.

Fold line 14 on face layer 4 allows the closure seal 2 to be folded longitudinally along said fold line 14 over the end of a container to be sealed. In a preferred embodiment face layer 4 further comprises indicia 18. Indicia 18 can be any form of indicia desired, such as but not limited to printing, decals and the like.

Base layer 8 may comprise a polymer, paper or foil or a composite or laminate thereof. Examples of suitable polymers are coated or uncoated polymers such as but not limited to polypropylene, polyethylene and polyester and the like. A specific example of a suitable material for the base layer 8 is acrylic coated polypropylene such as but not limited to 220 AB available from Mobil Chemical Company. Base layer 8 preferably further comprises at least one score cut 9 which facilitates a "crack and peel" partial removal of face layer 4 from base layer 8.

Releasable and resealable coating or coextruded layer 6 can be an adhesive coating such as but not limited to a tacky pressure sensitive adhesive, a low tack or nontacky cling-type coating having an affinity for and preferentially adherable to the base layer or container to be sealed, or a coextruded layer such as but not limited to a highly plasticized polymer such as highly plasticized vinyl. A low tack or nontacky coating is preferable in the present invention to avoid adhesion of particulate matter that could inhibit reclosure of the seal 2. Coating or coextruded layer 6 is preferably disposed over the entire back surface of face layer 4. However, coating 6 may be disposed on only a portion of the back surface of face layer 4. In one embodiment, wherein the fold line 14 defines two halves of the face layer 4, coating 6 in the form of a removable and repositionable pressure sensitive adhesive is disposed on one half of the back surface of face layer 4 and a permanent adhesive coating is disposed on the other half of the back surface of face layer 4.

Figure 2:
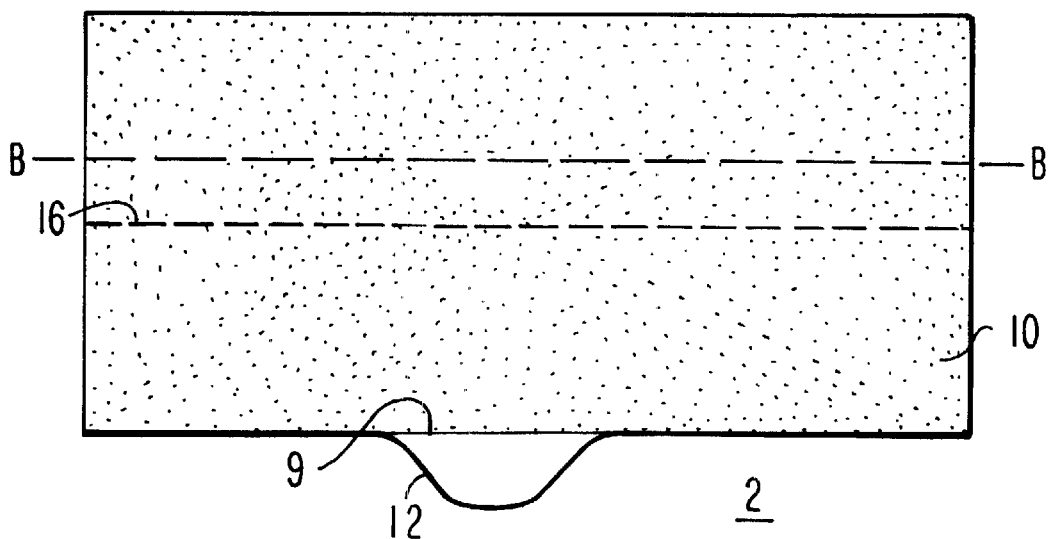
FIG. 2 is a bottom plan view of one embodiment of the closure seal of the present invention.
Figure 3:
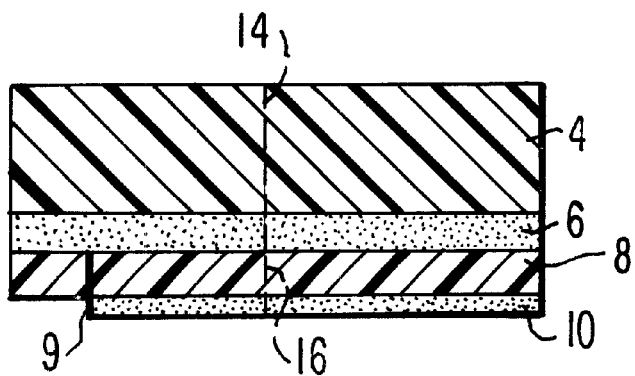
FIG. 3 is a sectional view of one embodiment of the closure seal of the present invention taken through line A—A of FIG. 1.
Figure 4:
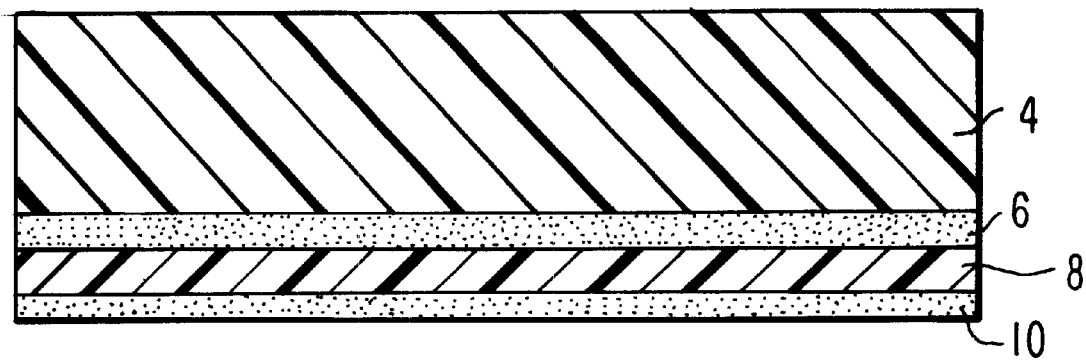
FIG. 4 is a sectional view of one embodiment of the closure seal of the present invention taken through line B—B of FIG. 2.

Adherent coating or coextruded layer 10 is disposed on at least a portion of the back surface of base layer 8. Coating 10 is preferably a heat-sealable permanent adhesive such as but not limited to 37P295 from Morton International. As best seen in FIGS. 2 and 3, coating or coextruded layer 10 is preferably disposed over the enture bottom surface of base layer 8 except for the portion of base layer 8 forming tab 12 to facilitate easy grasping of tab 12. However, coating or coextruded layer 19 may be disposed partially on said back surface of base layer 8 if desired to provide a removable coupon portion of said base layer 8.

Figure 5:
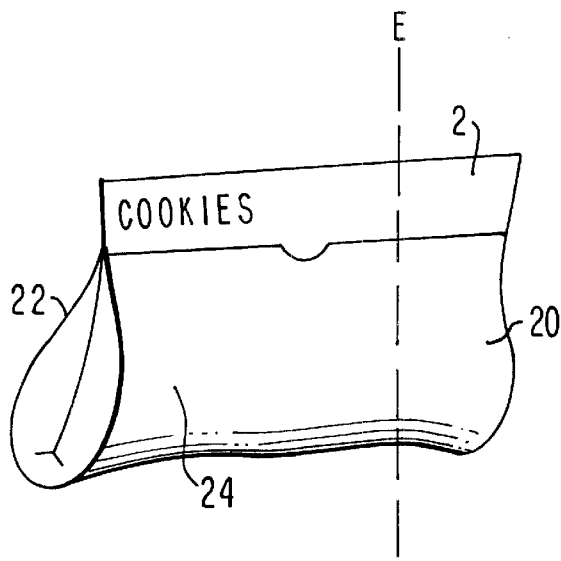
FIG. 5 is a perspective view of the closure system of the present invention.
Figure 7:
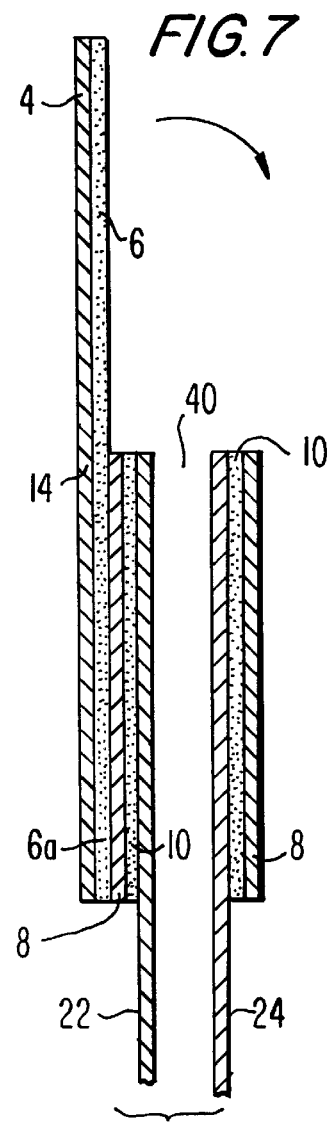
FIG. 7 is a sectional view of the embodiment of the closure system of FIG. 10 wherein the closure is opened.
Figure 6:
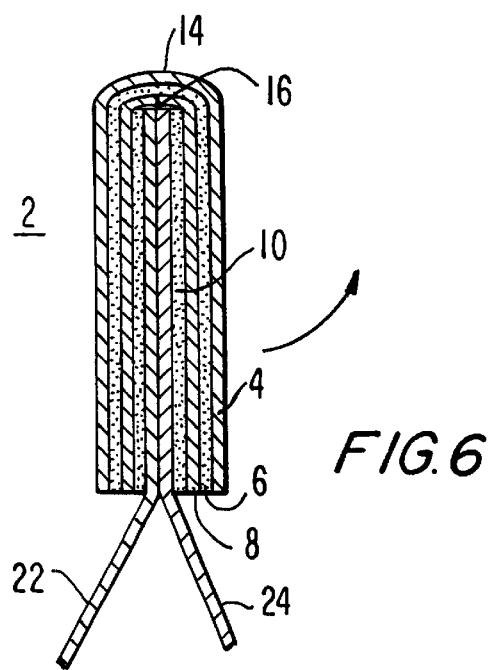
FIG. 6 is a sectional view of one embodiment of the closure system of FIG. 9 taken through line E—E of FIG. 9.

Now referring to FIGS. 5 and 6, in one embodiment closure seal 2 is adhered to a bag 20 having sides 22 and 24 by means of adhesive coating 10. Specifically, closure 2 is foldable over the sides 22 and 24 of bag 20 and adhesive coating 10 seals closure 2 to bag 20 with greater adhesion of the base layer 8 to the bag 20 than adhesion of the face layer 4 to the base layer 8. Now referring to FIG. 7, face layer 4 and releasable coating or coextruded layer 6 is removable from base layer 8 with base layer 8 remaining adhered to the bag 20. As face layer 4 and coating 6 are removed from base layer 8, longitudinal cut 16 is exposed, thereby allowing access to the contents of bag 20 through bag opening 40. In an alternative embodiment releasable coating 6 is disposed on one half of face layer 4 and the remaining half of face layer 4 is permanently adhered to base layer 8, such as by a permanent adhesive 6a, thereby securing face layer 4 of closure seal 2 to one side of the bag 20 permanently to avoid loss of the face layer 4. Base layer 8 remains attached to side 24 of bag 20. In an alternative embodiment (not shown), face layer 4 is removed from coating or coextruded layer 6 and coating 6 remains on said base layer 8. Closure 2 is resealable, as seen in FIGS. 6 and 7, by folding face layer 4 over bag opening 40 and base layer 8.

Figure 12:
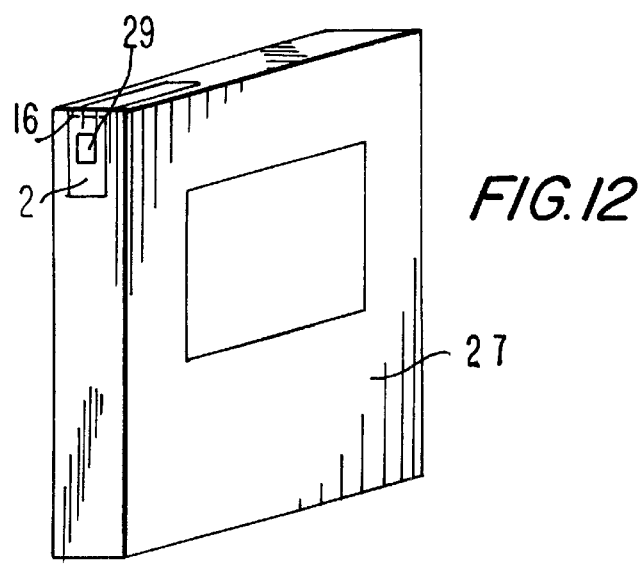
FIG. 12 is a perspective view of one embodiment of the closure system of the present invention.

Now referring to FIG. 12, the closure seal 2 may be employed on a container such as a box 27 having an opening 29. In another embodiment the container is formed of the same material as the base layer 8 and the closure seal 2 and the container to be sealed form a closure seal system for containing materials such as dry or liquid food, fertilizer, detergents and the like.

In a preferred embodiment, longitudinal cut 16 is a perforation formed on said base layer 8. In this embodiment, perforation 16 is exposed as face layer 4 is separated from base layer 8. Perforation 16 is openable by exertion of manual pressure on said perforation. In this embodiment the perforation 16 serves as a tamper evident, nonresealable seal. Face layer 4 is foldable along fold line 14 over base layer 8 in the aforementioned manner to provide resealable closure of bag 20.

Figure 8:
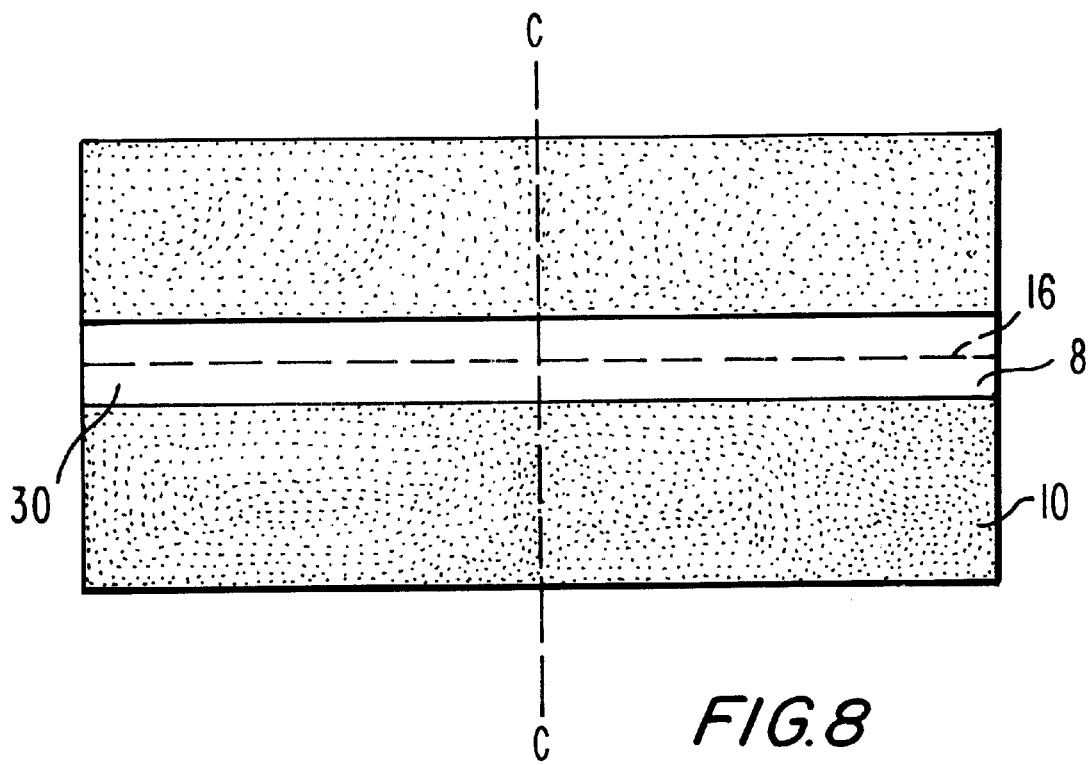
FIG. 8 is a bottom plan view of a preferred embodiment of the closure seal of the present invention.
Figure 9:
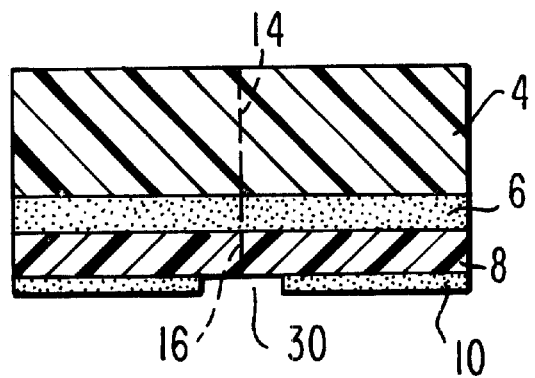
FIG. 9 is a sectional view of the preferred embodiment of the closure seal of FIG. 5 taken through line C—C of FIG. 5.

Now referring to FIGS. 8 and 9, in a preferred embodiment base layer 8 is only partially coated with coating 10 which in this embodiment is a permanent adhesive. A dropout region 30 is formed by an uncoated area of base layer 8, preferably on either side of longitudinal cut or perforation 16. In a most preferred embodiment, dropout region 30 measures from about 1/10 inch to about 3/4 inch in width. Alternatively, dropout region 30 may be formed by forming an abhesive coating over a selected area of coating or coextruded layer 10 to deaden the adhesive characteristics of coating or layer 10. Any abhesive coating may be used such as but not limited to C-type nitrocellulose, commercially available from Flint, Inc., or any suitable silicone resin such as are available from Dow or General Electric. This embodiment of the closure seal avoids sealing of the closure to itself in the fold area in the event the edge of the container to be sealed is not aligned flush with the perforation 16.

Figure 10:
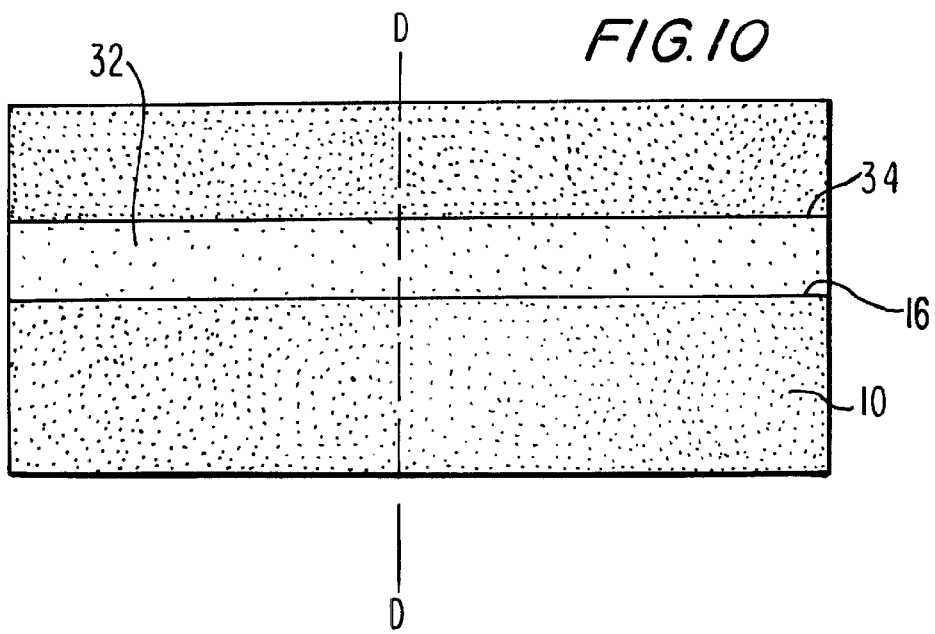
FIG. 10 is a bottom plan view of a preferred embodiment of the closure seal of the present invention.
Figure 11:
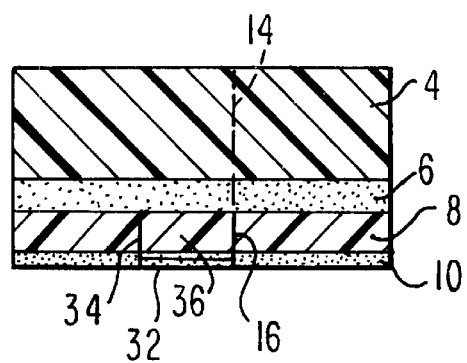
FIG. 11 is a sectional view of the preferred embodiment of the closure seal of FIG. 7 taken through line D—D of FIG. 7.

Now referring to FIGS. 10 and 11, in another preferred embodiment, base layer 8 further comprises longitudinal cut 34. The area between cut 16 and cut 34 forms removable piece 36. Deadened adhesive area 32 is disposed on base layer 8 in the region between cuts 16 and 34 forming removable piece 36. In this embodiment the adhesion of the base layer 8 is stronger to the face layer 4 than the adhesion of the base layer to the container (not shown) in the area 32 between cuts 16 and 34 forming removable piece 36. In this embodiment the face layer 4 is removable from base layer 8 except that removable piece 36 of base layer 8 adheres to face layer 4 in the region between cuts 16 and 34 as face layer 4 is peeled away. Removable piece 36 may then be removed from pressure sensitive adhesive coating 6. Removable piece 36 may have indicia disposed thereon and be used as a coupon (not shown). Face layer 4 is resealable over base layer 8 in the manner described hereinabove. The cuts 16 and 34 may be in the form of perforations so that the removable piece 36 may be removed by tearing along said perforations. In this embodiment, moreover, multiple cuts and/or perforations may be employed to provide for multiple removable pieces in the manner described. In another embodiment, not shown, base layer 8 comprises only cut 16 enabling a larger portion of base layer 8 to be removed as a coupon. In this embodiment face layer 6 is resealable directly to the container to be sealed.

The patterning of the coating or layer 10 is not limited to the embodiments described herein. For example, it is possible to use "spot" adhesion such that only a small portion of the base layer 8 remains adhered to the bag 20 to be sealed.

From the foregoing, it is seen that this invention is one well adapted to attain all the ends and objectives hereinabove set forth together with other advantages which are inherent in the structure. Variations of the present invention will suggest themselves to those skilled in the art in light of the above-detailed description. All such variations and modifications are within the full intended scope of the appended claims.

What is claimed is:

1. A multiplayer resealable closure for a container comprising:
    at least one base layer having a front side and a back side, said base layer having at least one longitudinal cut formed thereon;
    at least one face layer having a front side-and a back side, said face layer having at least one releasable adherent layer releasably adhering said back side of said face layer to said front side of said base layer; and
    at least one adherent layer disposed on at least a portion of said back side of said base layer for permanent attachment of said base layer to a container and an uncoated portion of a back surface of said base layer, said uncoated portion of said base layer being provided with a removable coupon portion disposed on said base layer.

2. The invention according to claim 1 wherein said longitudinal cut is a perforation.

3. The invention according to claim 1 further comprising indicia disposed on at least one of said layers.

4. The invention according to claim 1 wherein said base layer is selected from the group consisting of paper, polymer, foil, a composition of paper and polymer, a composition of paper and foil, a composition of polymer and foil and a composition of paper, polymer and foil.

5. The invention according to claim 1 wherein said face layer is selected from the group consisting of paper, polymer, foil, a composition of paper and polymer, a composition of paper and foil, a composition of polymer and foil and a composition of paper, polymer and foil.

6. The invention according to claim 1 wherein said releasable adherent layer is a pressure sensitive adhesive coating.

7. The invention according to claim 1 wherein said releasable adherent layer is a coextruded layer.

8. The invention according to claim 1 wherein said adherent layer is a permanent adhesive coating.

9. The invention according to claim 1 wherein said adherent layer is a coextruded layer.

10. The invention according to claim 1 further comprising a longitudinal fold line disposed on said face layer.

11. The invention according to claim 1 further comprising a tab formed on at least said base layer.

12. The invention according to claim 11 wherein said fold line defines two halves of said face layer and said releasable adherent layer further comprises a pressure sensitive adhesive coating disposed on one half of the back surface of said face layer and a permanent adhesive coating is disposed on the other half of the back surface of said face layer.

13. The invention according to claim 1 further comprising an area of deadened adhesive disposed on said longitudinal cuts forming at least one removeable piece wherein the adhesion of the base layer is stronger to the face layer than the adhesion of the base layer to a container to be sealed in the region between the cuts, and wherein said face layer is removable form said base layer except that at least one removable piece of said base layer adheres to said face layer in the region between said cuts as said lace layer is peeled away from said base layer and said at least one removable piece is removable form said face layer as a coupon.

14. The invention according to claim 1 wherein said base layer is only partially coated with a permanent adhesive forming an uncoated dropout region on either side of said longitudinal cut.

15. The invention according to claim 1 wherein said container to be sealed is a bag.

16. The invention according to claim 1 wherein said releasable adherent layer is disposed on at least a portion of said front side of said base layer.

17. The invention according to claim 1 wherein said releasable adherent layer is disposed on at least a portion of said back side of said face layer.

* * * * *